Aug. 9, 1949.    R. L. PURVIN    2,478,707
CATALYTIC REACTOR
Filed July 25, 1944

Robert L. Purvin INVENTOR.

BY
P. J. Whelan
ATTORNEY.

Patented Aug. 9, 1949

2,478,707

UNITED STATES PATENT OFFICE 2,478,707

CATALYTIC REACTOR

Robert L. Purvin, Goose Creek, Tex., assignor to Standard Oil Development Company, a corporation of Delaware Application July 25, 1944, Serial No. 546,560

3 Claims. (Cl. 23—285)

1

The present invention is directed to a catalyst feed nozzle for catalytic reactors for polymerization reactions in which the reactants polymerize quickly in contact with the catalyst and the polymerization may proceed to the production of rubbery-like masses.

A typical reaction of the type generally refered to above is the production of butyl rubber by the polymerization of a mixture of isobutylene with a small amount of isoprene or other diolefin in the presence of a highly active catalyst, such as aluminum chloride. In this reaction the catalyst is so active and the reaction proceeds with such violence that both the feed and the catalyst are highly diluted with an inert diluent, such as methyl chloride. It is customary in this reaction to provide a plurality of feed nozzles for the catalyst which makes possible the injection of small streams of diluted catalyst into a plurality of points of the hydrocarbon mixture. It is a frequent occurrence that overheating will take place at one or more points, causing excessive polymerization with the formation of agglomerates of polymer which tend to plug up the apparatus at different points. One result of this plugging action is to increase the pressure in the vessel with the result that the pressure of the reaction mixture may become greater than the pressure at which the catalyst is injected. When this happens reaction mixture is forced into the catalyst nozzle wherein reaction takes place, forming a plug which renders the catalyst nozzle inoperative until it is cleaned out.

The principal object of the present invention is the provision of a catalyst nozzle for use in reactions of the aforedescribed type provided with means for shutting off the opening at the inner end of the nozzle when the pressure of the reaction mixture equals the pressure at which the catalyst is being injected. This positively prevents the intrusion of any reaction mixture into the catalyst nozzle.

A further object of the present invention is the provision in a reactor of the type described of a plurality of automatically operated catalyst nozzles so adjusted that they can be brought into operative condition in sequence as the reaction rate progresses and more catalyst is required in the reaction.

2

Figure 1:
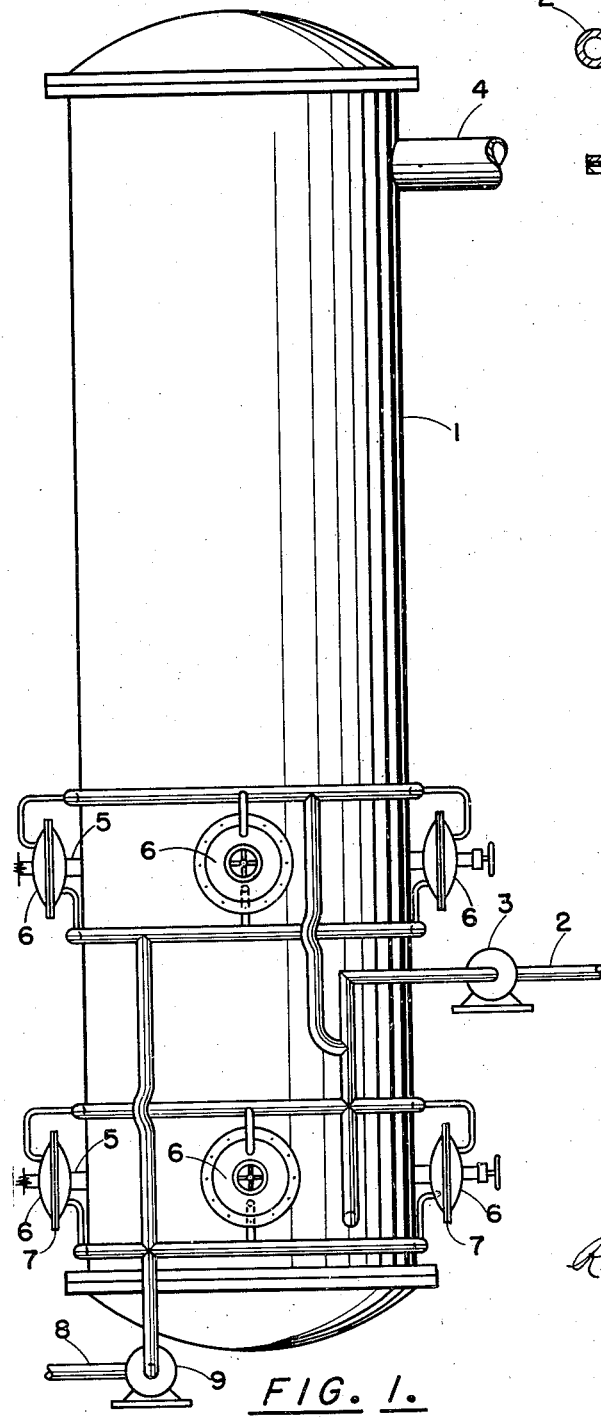
Figure 2:
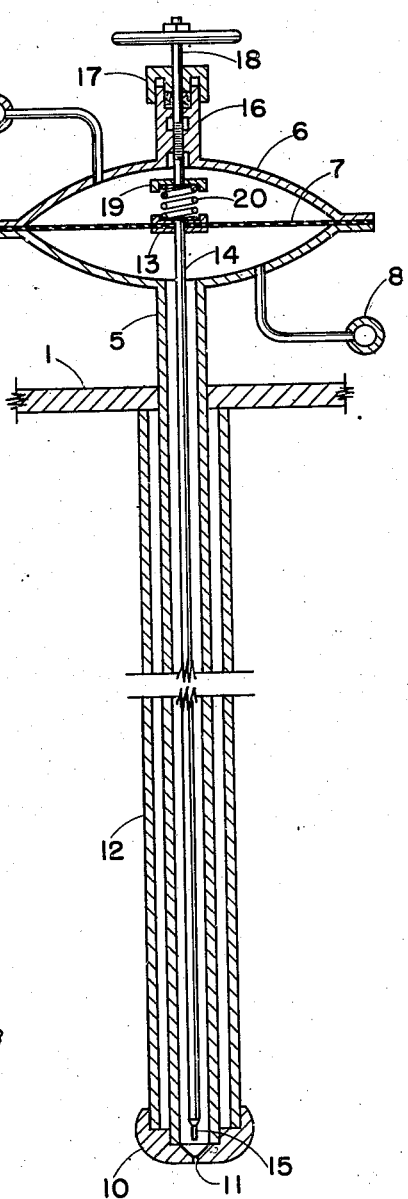

Further objects and advantages of the present invention will appear from the accompanying drawing, in which:

Fig. 1 is a front elevation of a reactor equipped wth catalyst nozzles according to the present invention; and Fig. 2 is a longitudinal section through a catalyst nozzle according to the present invention.

Referring to Fig. 1 in detail, numeral 1 designates a reactor which may be of the well known annular or tubular type for use in the polymerization of isobutylene. Hydrocarbon feed is pumped into this vessel through line 2 by pump 3. At the upper end of the reactor is an overflow line 4 for reaction product. It will be understood that the reaction material is introduced into the reactor in a highly diluted state. Arranged around the lower end of the reactor are a plurality of catalyst injection nozzles 5. Each of these nozzles has the design shown in Fig. 2. At the outer end of each nozzle is a diaphragm head 6, divided into two sections by a diaphragm 7. Catalyst is introduced into the inner section of each diaphragm head by suitable connections with catalyst feed line 8, provided with a pump 9. Fresh feed is introduced into the outer section of each diaphragm head by suitable connections to feed line 2. Referring to Fig. 2, it will be observed that the catalyst nozzle 5 extending through the wall of the reactor 1 terminates in a jet end 10 having a central orifice 11. Also connected with jet end 10 is jacket 12, spaced from the tube 5 so as to provide a blanket of gas to insulate the fluid passing through the interior tube 5 from the extremely cold material around the jacket 12. The hollow head 6 is elliptical in cross-section and is provided with a central diaphragm dividing it into an outer section and an inner section. Carried by the diaphragm at its center is a disc 13, from the inner face of which extends a rod 14 which terminates in a needle 15 of a size suitable for closing the orifice 11.

The outer section of the head is provided with a centrally located nipple 16 carrying at its outer end a packing gland 17, through which passes a rod 18 having at its inner end a flanged disc 19. Between the disc 19 and the disc 13 is mounted a spring 20. The rod is screw-threaded in the nipple so that by turning the rod the pressure on the disc 13 by the spring can be increased. For use in actual practice the compression of the spring is so adjusted that when the pressures on opposite sides of the diaphragm are equal, the spring will force the needle valve 15 into sealing position.

As can be seen, the branch line from the feed line 2 is connected to the upper section of the nozzle head and the branch line from the catalyst header 8 is connected to the lower section of the nozzle head. In normal operation, in order to feed catalyst into the reactor, the pressure on the catalyst header is adjusted so as to be sufficiently in excess of the pressure on the feed line to lift the needle valve off its seat. As can be seen, however, if there is an unexpected surge of pressure in the feed line due to some plugging action in the reactor, as soon as the pressure in the feed line equals the pressure in the catalyst header the spring 20 will immediately close the orifice 11, thereby preventing any reaction mixture entering the nozzle.

As has previously been indicated, a plurality of these catalyst feed nozzles will be used in the reactor arranged at different points. As the reaction progresses, it becomes desirable to increase the amount of catalyst employed. By setting the spring 20 of the respective nozzles at different values, it is possible to arrange for the automatic cutting in of the nozzles in sequence simply by increasing the pressure on the catalyst feed.

The nature and objects of the present invention having been thus described, what is claimed as new and useful and is desired to be secured by Letters Patent is:

1. A reactor for catalytic reactions involving a liquid reactant and a liquid catalyst comprising a first feed conduit communicating with the interior of the reactor, a tube projecting into the interior of the reactor, the end of the tube inside the reactor being capped with a nozzle and the end of the tube exterior to the reactor communicating with a chamber, a flexible diaphragm mounted in said chamber and dividing it into a first and a second compartment, said second compartment being in communication with the interior of said tube, a conduit extending from said first feed conduit to said first compartment, a second feed conduit communicating with said second compartment, and a valve stem having one end connected to the diaphragm and extending through the tube, the other end of said stem being adapted for sealing engagement with the interior of the nozzle.

2. A device in accordance with claim 1 in which a spring is arranged in the first compartment of the chamber with an end in contact with the diaphragm and in which a rod member threadedly extends though the wall of the chamber with one end outside the chamber and the other end in the first compartment in contact with the other end of said spring.

3. A reactor for catalytic reactions involving a liquid reactant and a liquid catalyst comprising a first feed conduit communicating with the interior of the reactor, a plurality of tubes projecting into the interior of the reactor, a separate nozzle capping the end of each tube inside the reactor, a separate chamber exterior of the reactor carried by and in communication with each tube, a flexible diaphragm mounted in each chamber and dividing it into a first and a second compartment, said second compartment being in communication with the tube, a valve stem in each tube having one end connected to the diaphragm of the chamber carried by the tube and extending through the tube, the other end of said stem being adapted for sealing engagement with the interior of the nozzle, a spring arranged in the first compartment of each chamber with one end in contact with said diaphragm, a separate rod member threadedly extending through the wall of each chamber with one end outside the chamber and the other end in the first compartment in contact with the other end of the spring therein, first conduits extending from said first feed conduit to the first compartment of each chamber and second feed conduits communicating with the second compartments of each chamber.

ROBERT L. PURVIN.

REFERENCES CITED

The following references are of record in the file of this patent:

UNITED STATES PATENTS

| Number | Name | Date |
| --- | --- | --- |
| 1,935,977 | Geer | Nov. 21, 1933 |
| 2,164,411 | Kennedy | July 4, 1939 |
| 2,229,661 | Mann | Jan. 28, 1941 |
| 2,292,897 | Nielsen | Aug. 11, 1942 |